Patented Feb. 27, 1940

2,191,556

UNITED STATES PATENT OFFICE 2,191,556

POLYAMIDES

Wallace Hume Carothers, deceased, late of Wilmington, Del., by the Wilmington Trust Company, executor, Wilmington, Del., assignor to E. I. du Pont de Nemours & Company, Wilmington, Del., a corporation of Delaware No Drawing. Application August 16, 1938, Serial No. 225,242

13 Claims. (Cl. 260—78)

This invention relates to polymeric materials, and more particularly to new fiber-forming polyamides.

This case is a continuation-in-part of application Serial Number 88,492, filed July 1, 1936, now Patent No. 2,158,064, which in turn is a continuation-in-part of application Serial Number 181, filed January 2, 1935, now Patent No. 2,130,523.

In application Serial Number 181 there is disclosed polyamides derived from diamines and dibasic acids or amide-forming derivatives thereof. The polyamides thus prepared are high melting, relatively insoluble products which in many instances are, or can be converted into, highly polymeric products (superpolyamides) which may be drawn into useful fibers. In general these products are soluble only in formic acid and in phenols, and this fact restricts their utility for certain purposes.

The above mentioned application Serial Number 88,492 is based on the discovery that if one or both of the reactants, the diamine or dibasic acid, contains a heteroatom of the oxygen family, the resultant polyamides containing the heteroatom or atoms, although definitely unsuitable in many instances for the production of useful textile fibers and in other instances but indifferently useful for this purpose, are soluble in a large number of common organic solvents including cheap low-boiling solvents and are for this reason more adapted to the preparation of coating, impregnating, sizing, adhesive, and molding compositions than those prepared from polyamides which do not contain a heteroatom.

The present application is directed specifically to polyamides which contain a heteroatom of the oxygen family as in mentioned application Serial Number 88,492 but which in addition are definitely fiber-forming. Although it is generally more difficult to extend the polymerization of these products to the fiber-forming stage than in the case of the polyamides of application Serial Number 181, this further polymerization can be accomplished by following the procedure hereinafter described. The fiber-forming polyamides of the heteroatom type possess the same wide solubility characteristics as the non-fiber-forming polyamides described in application Serial Number 88,492, although solutions of the fiber-forming polymers are more viscous for a given concentration. By reason of this solubility in common solvents, particularly cheap low-boiling solvents, these polyamides can be converted into fibers, ribbons, films, and the like by the solution evaporation technique more simply and economically than the more insoluble polyamides referred to above. It also simplifies the blending of the polyamides with other ingredients, e. g., plasticizers and resins. In addition to being more soluble than the polyamides of application Serial Number 181, the heteroatom polyamides are more susceptible to chemical modification. For example, if the heteroatom is a divalent sulfur atom, it can be converted into a sulfone by oxidation.

This invention therefore has as an object the preparation of new and useful polymeric products. Another object is the preparation of polymeric products which are capable of being formed into useful filaments. A further object is the production of readily soluble polyamides which are useful in the coating and other art. Other objects will appear hereinafter.

These objects are accomplished by heating to reaction temperature substantially equimolecular proportions of a diprimary diamine and a dicarboxylic acid or an amide-forming derivative of a dibasic carboxylic acid, at least one of said reactants containing a heteroatom of the oxygen family, and continuing the reaction until a polymeric product is obtained which is capable of being formed into a continuous filament. By using as the diamine a diprimary diamine, by using equimolecular proportions of diamine and dibasic acid, and by continuing the polymerization reaction, the fiber-forming polyamides are obtained rather than the non-fiber-forming polyamides.

By "heteroatom" is meant an atom other than carbon which appears in the chain of atoms separating the reactive groups in the polyamide-forming reactants, i. e., the amino groups in the case of the diamine and the carboxyl groups in the case of the dibasic acid.

By "substantially equimolecular proportions" of diamine and dibasic acid is meant that not more than 5 molar per cent excess of either reactant is employed.

In the practice of the invention substantially equimolecular proportions of the diamine and dicarboxylic acid or amide-forming derivatives of a dibasic carboxylic acid (the ester, half ester, acid chloride, anhydride, or amide) are heated at amide-forming temperatures, generally in the range of 120° to 300° C., in the presence or absence of a diluent, until the product has a sufficiently high molecular weight to exhibit fiber-forming properties. The fiber-forming stage can be tested for by touching the molten polymer with a rod and drawing the rod away; if this stage has been reached, a continuous filament of considerable strength and pliability is readily formed. This stage is generally reached when the polyamide has an intrinsic viscosity of above 0.4 where intrinsic viscosity is defined as $$\frac{\log_e \eta_r}{C}$$

in which $\eta_r$ is the viscosity of a dilute solution of the polymer in metacresol divided by the viscosity of metacresol in the same unit and at the same temperature (e. g., 25° C.) and C is the concentration in grams of polymer per 100 cc. of solution. In general, measurement of the intrinsic viscosity will be the most convenient method for following the course of the reaction in determining whether a fiber-forming product has been obtained.

The reaction by which the fiber-forming polymers of this invention are obtained is a linear condensation polymerization and involves the formation of a by-product, such as water, alcohol, phenol, hydrogen chloride, or ammonia, depending upon the derivatives of the dibasic acid used in the reaction.

In general, the fiber-forming polyamides of this invention are prepared most economically from a diamine and a dicarboxylic acid. The first reaction which occurs when a diamine and a dicarboxylic acid are mixed and brought into sufficiently intimate contact is the formation of the diamine-dicarboxylic acid salt. It is often desirable to separate and purify the salt prior to its conversion into the polyamide. The salt is generally crystalline and readily purified by recrystallization from a suitable solvent, such as water, alcohol, or alcohol-water mixtures, and have definite compositions. The separation of the salt affords an automatic means for adjusting the amine and acid reactants to substantial equivalency and it avoids the difficulties attendant upon the preservation of the isolated amine in a state of purity. Formation and purification of the salt also tends to eliminate impurities present in the original diamine and dibasic acid.

The conversion of the diamine-dibasic acid salt to the polyamide is carried out by heating the salt at amide-forming temperatures, generally between 180° and 300° C., in the presence or absence of a diluent and under conditions which will permit the water formed in the reaction to escape, during the last stages of the reaction at least, until examination of a test portion of the product indicates that it has the desired fiber-forming properties. As examples of solvents which may be used in the reaction may be mentioned phenol, the cresols, the xylenols, diphenylolpropane, and orthohydroxydiphenyl. White medicinal oil is an example of a non-solvent which may be used. The first stage of the reaction can be carried out in the presence of water, e. g., in an autoclave under pressure.

The polyamides of this invention can be prepared in a similar manner by reacting a diamine with an amide-forming derivative of a dibasic carboxylic acid. In some instances, e. g., in the case of aryl esters of the dibasic acid, the polymerization reaction starts at a lower temperature than in the case of the free acid or salt.

The polymerization reaction whereby the polyamides of this invention are made can be carried out at atmospheric, superatmospheric, or subatmospheric pressure. Except in the case where an aryl ester of the dibasic acid is used, in which case the by-product is a phenol, the last stages of the reaction, at least, should be carried out under conditions which permit the escape of the by-product of the reaction. This is generally done by operating at atmospheric or reduced pressure during the last stages of the reaction. Preferably the reaction is carried out in the absence of oxygen, e. g., in an atmosphere of nitrogen, or in a vacuum. An antioxidant may be added if desired. While it is usually unnecessary to add a catalyst, inorganic materials of alkaline reaction such as oxides and carbonates, and acidic materials such as halogen salts of polyvalent elements, e. g., aluminum and tin, are sometimes helpful.

The products of this invention are synthetic linear polyamides since they are derived from bifunctional polyamide-forming reactants, i. e., reactants containing two amide-forming groups. The amide groups in these polyamides form an integral part of the main chain of atoms in the polymer. These polyamides are distinguished from those described in the above mentioned application Serial Number 181 in that they contain a heteroatom of the oxygen family in the chain of atoms which make up the polymer. Since the polyamides on hydrolysis with strong mineral acid, e. g., hydrochloric acid, revert to the diamine (as acid salt, e. g., hydrochloride) and the dibasic acid from which they are derived, it will be apparent that hydrolysis of the products will yield a monomeric product containing a heteroatom of the oxygen family in the chain separating the amide-forming group of said product. In other words, these polyamides yield on hydrolysis with hydrochloric acid a monomeric product of formula XRAR'X in which X represents a carboxyl group or an amine hydrochloride group, R and R' represent divalent hydrocarbon radicals, and A represents a heteroatom or heteroatoms of the oxygen family.

As already indicated, the polyamides of this invention are characterized by their solubility in a wide range of common solvents. In general the polyamides are soluble in such solvents as alcohols, ethylene chlorohydrin, dioxan, ethers of ethylene glycol, mixtures of alcohols with aromatic hydrocarbons, and mixtures of alcohols with chlorinated hydrocarbons, e. g., alcohol-chloroform mixtures. They are also soluble in formic acid and phenol, the solvents mentioned in connection with the polyamides of application Serial Number 181. In addition some of the polyamides of the present invention are soluble in water.

The polyamides of this invention are further characterized by their fiber-forming properties, i. e., their ability to be formed into filaments which can be cold drawn into fibers showing by characteristic X-ray diffraction patterns orientation along the fiber axis. One method (wet process) of spinning these polyamides into filaments consists in dissolving them in a suitable solvent, e. g., dioxan, and extruding the solution through orifices into a liquid which dissolves the solvent but not the polyamide, e. g., a hydrocarbon or in some instances water, and collecting the filaments thus formed on a suitable revolving drum. Another method (dry process) consists in extruding a solution of the polyamide into a heated chamber where the solvent is removed by evaporation. Still another method (melt process) consists in extruding the molten polyamide through orifices into the atmosphere where it congeals into a filament. In some cases, particularly when the filaments are large. e. g., of bristle size, it is advantageous to spin the molten material into a cooling liquid, e. g., water. By similar processes the polyamides can be formed into rods, sheets, foils, ribbons, films, and the like. In the various methods of forming shaped articles from the products of this invention, and particularly when these articles are obtained from solution, the characteristics of the filaments, etc., can be altered by blending the polyamides with other polyamides or with resins, plasticizers, cellulose derivatives, pigments, dyes, delusterants, etc.

After spinning the filaments are normally cold drawn since this improves their strength and elasticity. The filaments of this invention vary in the extent to which they can be cold drawn but generally the degree of cold drawing possible will lie between 150 and 500 per cent. Although ribbons, sheets and the like can also be cold drawn, it is generally more advantageous to cold roll these products. By cold rolling such products in mutually perpendicular directions it is possible to obtain products of great strength in all directions.

Although the properties of the fibers of this invention vary with the nature of the reactants used in their preparation, properties which characterize the fibers as a class are good elastic recovery, orientation along the fiber axis, good strength, and good dyeing characteristics.

The following examples, in which parts are by weight, are illustrative of the preparation and application of the products of this invention.

Example I

One hundred (100) parts of phenol (solvent) and 172 parts of the salt derived from decamethylenediamine and p,p'-diphenylolpropane diacetic acid were heated together for two hours at 200°–230° C. During the last half hour the pressure was reduced to 2 mm. to remove the phenol and the water formed in the reaction. The polyamide thus formed contained the heteroatom oxygen as illustrated by the following formula for the recurring structural unit in said polyamide:

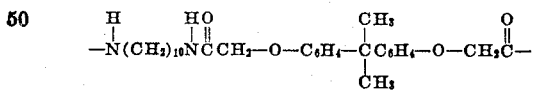

The polyamide had an intrinsic viscosity of 0.65 and a melting point of about 65° C. It could be spun from melt into filaments capable of being cold drawn at least 400 per cent. The resultant fibers exhibited orientation along the fiber axis. The polyamide was soluble in the ethyl ether of ethylene glycol, in dioxan, and in certain mixtures of ethanol and benzene, and could be spun into filaments by the wet process using solvents of these types. The polyamide was compatible with drying oil modified polyhydric alcohol-polybasic acid resins and with nitrocellulose; it could be used in coating compositions either alone or in conjunction with these materials as well as other film-forming materials. These compositions showed good adhesion to metal, glass, and to films of regenerated cellulose. In addition, they had good resistance to water, alkali, and acid. Self-supporting films made from solutions of the polymer in dioxan or other solvents were strong and tough. The polyamide was also well adapted to molding; it could be molded at 100°–125° C. under 1500 lbs./sq. in. pressure to a hard, tough, amber-colored product.

Example II

To a solution consisting of 14.5 parts of p,p'-diphenylolpropane diacetic acid, 24.6 parts of adipic acid, and 150 parts of ethanol, there were added a solution of 24.5 parts of hexamethylenediamine in 200 parts of ethanol. The resultant salt (63 parts) was separated and heated with an equal weight of phenol under conditions which permitted the phenol and water to distil slowly from the reaction mixture. The heating was carried out as follows: 0.5 hour at 200°–210° C., 1.0 hour at 220°–225° C., and 0.5 hour under 3 mm. absolute pressure, while increasing the temperature slowly to 295° C. to remove all the phenol. The polymer thus formed was a tough, hard, microcrystalline product. It melted at 225° C. and had an intrinsic viscosity of 0.71. The polyamide could be readily spun into filaments capable of being cold drawn into oriented fibers. It will be noted that this product is an interpolymer, derived from a diamine and a mixture of dibasic carboxylic acids, one of which (diphenylolpropane diacetic acid) contains the heteroatom oxygen.

Example III

Six (6) parts of the salt derived from hexamethylenediamine and diglycolic acid were heated in a sealed tube for three hours at 230° C. The tube was then opened and the contents (low polymer) heated under reduced pressure, i. e., with removal of the water of reaction, for three hours at 240° C. The resulting polyamide (high polymer) had an intrinsic viscosity of 0.45. It was quite tough and could be spun into fibers capable of cold drawing. The fibers melted at 145°–150° C. The polymer was soluble in hot ethanol, butanol, and diethylene glycol.

Example IV

Two (2) parts of the salt derived from 3,3'-diamino-dipropyl ether and adipic acid, and 2 parts of ortho-hydroxydiphenyl were heated together in the absence of air for two hours at 250° C. The hydroxydiphenyl was then removed by heating under reduced pressure at 250° C. for two hours. The polyamide thus obtained was a colorless, tough polyamide having an intrinsic viscosity of 1.2 and a melting range of 185°–190° C. It was soluble in dioxan and in hot alcohols, e. g. butanol and benzyl alcohol. The polyamide could be readily spun from melt or from solution into filaments which yielded oriented fibers on cold drawing.

Example V

Equal parts of ortho-hydroxydiphenyl and the salt derived from hexamethylenediamine and the dicarboxylic acid of formula

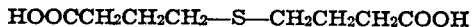

were heated together at 218° C. for three hours in the absence of oxygen. The hydroxydiphenyl was then removed by heating at 250° C. under high vacuum for one hour. After two hours' additional heating at 230° C., the polymer was found to have an intrinsic viscosity of 0.76 and a melting point of 200° C. The polymer was soluble in hot benzyl alcohol and in ethanol containing hydrogen chloride. The polymer could be spun into filaments capable of cold drawing. The cold drawn filaments had a tenacity of 2.5 grams per denier.

Example VI

Ten (10) parts of the salt derived from triglycoldiamine, $$NH_2CH_2CH_2OCH_2CH_2OCH_2CH_2NH_2$$

and adipic acid were heated in a sealed tube at 200°–230° C. for 1.5 hours. The mixture was sooled, the tube opened, and the content heated under nitrogen pressure at 218° C. for three hours, and then for three hours at 218° C. under a pressure of 3 mm. The polymer thus obtained had an intrinsic viscosity of 0.78 and a melting point of 185° C. It was soluble in water, alcohol, and dioxan. On spinning from melt, at 210° C., it yielded filaments which could be cold drawn about 350 per cent. The cold drawn fibers had a tensile strength of 2.6 grams per denier. The water solubility of this polyamide rendered it especially useful for certain purposes. For example, sheets and fabrics made from the polyamide were found to be useful as a foundation or ground fabric for making lace, embroidery or the like, because the ground fabric or sheet could be readily removed after the forming of the lace or embroidery by treatment with water. The polyamide ground fabric or sheet dissolves in the water, leaving the lace intact. The polyamide can be recovered from the aqueous solution by distilling off the water. An advantage which such water-soluble ground fabrics have over those of the cellulosic type is that they can be removed from the lace without carbonization. Carbonization treatments generally have some deleterious effect on the lace.

Example VII

The salt derived from hexamethylenediamine and sulfone dibutyric acid,

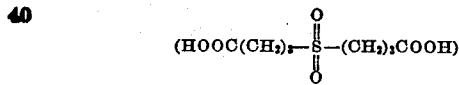

was heated in a sealed tube at 215°–220° C. for 1.5 hours. The reaction mixture became fluid when the salt melted (M. P. 169°–170° C.) but resolidified during the polymerization of the salt. The low polyamide thus formed was converted into a fiber-forming polymer by heating in the solid state at 0.5 mm. absolute pressure for 5 hours at 200° C. The resulting polyamide melted the decomposition at 249°–251° C. and had an intrinsic viscosity of 0.68. Owing to the thermal instability of the polymer at elevated temperatures, filaments, films, etc. were more readily formed from solutions of the polymer, e. g. from phenol solutions, than from the molten polymer.

It will be apparent that a large variety of polyamides can be prepared by the process of this invention. For example, it is possible to make polyamides in which the diamine represented contains the heteroatom, polyamides in which the dibasic acid represented contains the heteroatom, and polyamides in which both the diamine and dibasic acid represented contain heteroatoms. As indicated in Example II, it is also possible to make polyamides in which only a part of the diamine or dibasic acid reactant is of the heteroatom type. A mixture of diamines and/or dibasic acids can be used in the preparation of interpolyamides. In general interpolyamides derived from four or more components are characterized by even greater solubility than the straight polyamides. Other bifunctional reactants, e. g., amino acids, hydroxy acids, and glycols, can also be used in conjunction with the diamines and dibasic acids.

As additional examples of acids containing heteroatoms that can be used in this invention may be mentioned diphenylolcyclohexane diacetic acid, di-beta-naphthol diacetic acid, resorcinol diacetic acid, dithioglycolic acid, and acids of the following types $$HOOCCH_2—C_6H_4—O—C_6H_4—CH_2COOH$$

and $$HOOCCH_2—O—C_6H_4—SO_2—C_6H_4—O—CH_2COOH.$$

The preferred acids are those in which the heteroatom is separated from the carboxyl group by a chain of at least three atoms. A typical example of an acid of this type is that used in Example V. As additional examples of such acids may be mentioned $$HOOC(CH_2)_3O(CH_2)_3COOH,$$
$$HOOC(CH_2)_4O(CH_2)_4COOH,$$
$$HOOC(CH_2)_4S(CH_2)_4COOH,$$
$$HOOC—C_6H_4—O—C_6H_4—COOH,$$

and $$HOOC—C_6H_4—O—CH_2—O—C_6H_4—COOH.$$

As additional examples of diamines which can be reacted with dibasic acids or derivatives thereof containing a heteroatom may be mentioned tetramethylhexamethylenediamine, 3-methylhexamethylenediamine, octamethylenediamine, nonamethylenediamine, tetradecamethylenediamine, p-xylenediamine, and m-phenylenediamine.

Aditional examples of diamines containing heteroatoms which may be used in the process of this invention are $$NH_2CH_2CH_2—O—CH_2CH_2NH_2$$
$$NH_2(CH_2)_4—O—(CH_2)_4NH_2,$$
$$H_2N—C_6H_4—O—C_6H_4—NH_2,$$
$$H_2N—C_6H_4—O—CH_2—CH_2—O—C_6H_4—NH_2,$$
$$NH_2CH_2—C_6H_4—O—C_6H_4—CH_2NH_2,$$

and the corresponding sulfur analogs. Polyamides derived from diamines containing oxygen as a heteroatom are characterized by sensitivity to water, many polymers of this type being water-soluble. Polyamides derived from diamines containing at least two oxygens as heteroatoms are in general quite soluble in water. As further examples of dibasic acids or amide-forming derivatives thereof with which the diamines containing heteroatoms may be reacted are mentioned dibutyl carbonate, diethyloxalate, malonic acid, glutaric acid, adipic acid, β-methyl adipic acid, pimelic acid, suberic acid, azelaic acid, sebacic acid, p-phenylene-diacetic acid, isophthalic acid, and diphenic acid. The most useful polyamides of this invention are obtained by selecting reactants the sum of whose radical lengths is at least 9.

For certain uses, e. g., spinning from melt, it is desirable to have polyamides which do not undergo further polymerization (increase in viscosity) during heating. In order to obtain such products, the polyamide should be prepared with the use of a small excess, not over 5 molar per cent, of diamine or dibasic acid, or in the presence of a reactant containing a single amide-forming group, e. g., a monocarboxylic acid or a monoamine.

The polyamides of this invention can also be prepared in the presence of modifying agents, e. g., pigments, resins, delusterants, dyes, etc. This is generally the most satisfactory method of introducing the modifying agent if the polyamide is to be used without a solvent.

As already indicated the products of this invention are characterized by good solubility and compatibility characteristics. They can be admixed with drying oils, resins, cellulose derivatives, etc. These properties make the products useful in the coating, plastic, sizing, adhesive, impregnating, and textile art. Certain of the products can be used directly as such in the preparation of lacquers and enamels.

In the form of filaments or fibers the products of this invention have many uses. Those having sufficiently high melting points can be used in the preparation of knitted, woven, and pile fabrics for various uses. In these applications the fibers can be used in the form of continuous fibers or staple fibers. They can be admixed with other types of fibers in the preparation of mixed fabrics. The fibers, and particularly the water-soluble ones, are useful in making ground fabrics for lace making. The large filaments are useful as bristles, dental floss, fishlines, fishnets, fishline leaders, racquet strings, etc.

The polymers of this invention are also useful in making self-supporting films for wrapping purposes and other uses. The thicker films or sheets can be used as interlayers for laminated articles, e. g., safety glass. Other uses for the polymer are electrical insulation, turnery compositions, molding, bonds for abrasives, impregnating compositions, and coating compositions for paper, leather, cloth, metals, and other surfaces.

As many apparently widely different embodiments of this invention can be made without departing from the spirit and scope thereof, it is to be understood that this invention is not limited to the specific embodiments thereof except as defined in the appended claims.

What is claimed is:

1. A process for making polymers which comprises heating at amide-forming temperatures substantially equimolecular proportions of a diprimary diamine and a substance of a class consisting of dicarboxylic acids and amide-forming derivatives of dibasic carboxylic acids, at least one of the reactants containing a heteroatom of the class consisting of oxygen and sulfur in the chain separating the amide-forming groups, and continuing said heating until a polymer is formed which is capable of yielding fibers exhibiting by X-ray diffraction patterns orientation along the fiber axis.

2. A process for making polymers which comprises heating at amide-forming temperatures substantially equimolecular proportions of a diprimary diamine and a substance of the class consisting of dicarboxylic acids and amide-forming derivatives of dibasic carboxylic acids, at least one of the reactants containing a heteroatom of the class consisting of oxygen and sulfur in the chain separating the amide-forming groups, and continuing said heating with removal of the by-product of the reaction until a polymer is formed which is capable of yielding fibers exhibiting by X-ray diffraction patterns orientation along the fiber axis.

3. The process set forth in claim 1 wherein said heteroatom is present in the diamine.

4. The process of claim 1 wherein said heteroatom is present in the substance of the class consisting of dicarboxylic acid and amide-forming derivatives of dibasic carboxylic acids.

5. The process set forth in claim 1 in which the radical length of the diamine and dicarboxylic acids are such that their sum is at least 9.

6. A synthetic linear polyamide capable of yielding fibers showing by characteristic X-ray patterns orientation along the fiber axis, said polyamide having recurring structural units containing a heteroatom of the class consisting of oxygen and sulfur in the chain of atoms constituting said units.

7. A polyamide obtained by condensation polymerization from a diprimary diamine and a dicarboxylic acid, said diamine having a heteroatom of the class consisting of oxygen and sulfur in the chain of atoms separating the amino group, said polyamide being capable of yielding continuous filaments exhibiting by X-ray diffraction patterns orientation along the fiber axis.

8. A polyamide obtained by polymerization from a diprimary diamine and a dicarboxylic acid having a heteroatom of the class consisting of oxygen and sulfur in the chain of atoms separating the carboxyl groups, said polyamide being capable of yielding continuous filaments exhibiting by X-ray diffraction pattern orientation along the fiber axis.

9. A synthetic linear polymer capable of yielding fibers showing by characteristic X-ray patterns orientation along the fiber axis, said polymer yielding on hydrolysis with hydrochloric acid a diamine hydrochloride and a dicarboxylic acid containing a heteroatom of the class consisting of oxygen and sulfur in the chain of atoms separating the carboxyl groups in said dicarboxylic acid.

10. A synthetic linear polymer capable of yielding fibers showing by characteristic X-ray patterns orientation along the fiber axis, said polymer yielding on hydrolysis with hydrochloric acid a dicarboxylic acid and a diamine hydrochloride containing a heteroatom of the class consisting of oxygen and sulfur in the chain of atoms separating the amino groups in said diamine hydrochloride.

11. A synthetic linear polyamide in the form of a fiber exhibiting orientation along the fiber axis, said fiber yielding on hydrolysis with hydrochloric acid a diamine hydrochloride and a dicarboxylic acid, at least one of said hydrolysis products containing a heteroatom of the class consisting of oxygen and sulfur in the chain of atoms separating the amide-forming groups.

12. The process set forth in claim 1 wherein said heteroatom is a sulfur atom which is an integral part of a sulfone group.

13. The polyamide set forth in claim 6 in which said heteroatom is a sulfur atom which is an integral part of a sulfone group.

ELWYN EVANS,
*For Wilmington Trust Company, Executor of the Estate of Wallace Hume Carothers, Deceased.*